United States Patent [19]

Emberson

[11] Patent Number: 5,761,468
[45] Date of Patent: Jun. 2, 1998

[54] HARDWARE MECHANISM FOR OPTIMIZING INSTRUCTION AND DATA PREFETCHING BY FORMING AUGMENTED PREFETCH INSTRUCTIONS

[76] Inventor: David R. Emberson, 300 Moore Creek Rd., Santa Cruz, Calif. 95060

[21] Appl. No.: 648,533

[22] Filed: May 15, 1996

[51] Int. Cl.⁶ .................. G06F 9/38; G06F 12/00
[52] U.S. Cl. .................. 395/383; 711/137; 711/213
[58] Field of Search .................. 395/250, 383; 711/119, 123, 129, 213, 118, 137

[56] References Cited

U.S. PATENT DOCUMENTS

| | | | |
|---|---|---|---|
| 4,454,578 | 6/1984 | Matsumoto et al. | 395/380 |
| 4,502,110 | 2/1985 | Saito | 711/123 |
| 4,551,799 | 11/1985 | Ryan et al. | 711/140 |
| 5,095,424 | 3/1992 | Woffinden et al. | 711/123 |
| 5,168,560 | 12/1992 | Robinson et al. | 711/123 |
| 5,261,066 | 11/1993 | Jouppi et al. | 395/449 |
| 5,305,389 | 4/1994 | Palmer | 382/305 |
| 5,307,477 | 4/1994 | Taylor et al. | 711/3 |
| 5,317,718 | 5/1994 | Jouppi | 711/137 |
| 5,367,656 | 11/1994 | Ryan | 395/421.03 |
| 5,410,653 | 4/1995 | Macon, Jr. et al. | 395/250 |
| 5,537,573 | 7/1996 | Ware et al. | 711/137 |
| 5,551,001 | 8/1996 | Cohen et al. | 711/122 |
| 5,603,004 | 2/1997 | Kurpanek et al. | 395/445 |
| 5,623,608 | 4/1997 | Ng | 395/250 |

OTHER PUBLICATIONS

Kai Hwang and Faye A. Briggs "Computer Architecture and Parallel Processing". 1984. McGraw–Hill, Inc., pp. 102–107.

*Primary Examiner*—Parshotam S. Lall
*Assistant Examiner*—Viet Vu
*Attorney, Agent, or Firm*—Marger, Johnson, McCollom & Stolowitz, P.C.

[57] ABSTRACT

Disclosed is a prefetch execution unit, prefetch instruction buffer and a prefetch victim buffer which operate to optimize prefetching by recording a particular cache miss' history. To record cache misses, victimized (overwritten) lines and/or a prefetch tag are stored in a prefetch victim buffer. When the processor experiences a cache miss, it accesses the prefetch victim buffer to retrieve information relating to the prefetch victim. The prefetch execution unit then modifies the values of the additional field or fields and then stores the modified augmented prefetch instruction in the prefetch instruction buffer. The next time a prefetch instruction for the victimized lines is executed by the processor, the new values of the modified augmented prefetch instruction will dictate where the prefetch information is stored or what size increment it has. By continuous modification of the augmented prefetch instructions, eventually thrashing may be eliminated.

30 Claims, 4 Drawing Sheets

HARDWARE MECHANISM FOR OPTIMIZING INSTRUCTION AND DATA PREFETCHING BY FORMING AUGMENTED PREFETCH INSTRUCTIONS

FIELD OF THE INVENTION

This invention relates to cache memory, and more particularly to a hardware mechanism for avoiding thrashing caused by data or instructions prefetched to a cache memory.

BACKGROUND OF THE INVENTION

In the computer industry, developers work to design computers with a higher operating speeds than the last generation of products. As the speed of the processing chips grows, the disparity between the speed of processors and the speed of their access to main memory also grows. This disparity is called memory latency. That is, instructions are executed by the processor at a much higher rate than data or instructions can be retrieved from the main memory. The result of memory latency is that the processor, while waiting for data or instructions to be transported from main memory, sits idly. A fast processor's efficiency is then drastically reduced by dead time.

The next generation of CPUs will operate at extremely high clock speeds, on the order of 3 nanoseconds. However, the clock speeds of main memory is expected to increase to only 50 nanoseconds. Thus, memory latency of the next generation of computers is expected to be greater than a 15:1 ratio.

To avoid memory latency, frequently used data and instructions (information) are stored in a cache memory which is closer to the processor than is the main memory. Developers often use prefetch instructions which are nestled in the code of an instruction stream to retrieve information from the main memory which is expected to soon be required during a program's execution. The prefetched information is stored in the cache for the processor's use.

Oftentimes, however, information stored in a cache will be overwritten by other information of a subsequent retrieval. When access to the overwritten information is required the processor will experience a cache miss. The overwritten information must again be retrieved from main memory, slowing down the execution of the program. This speed payment is known as a cache miss penalty.

To illustrate a cache miss, FIG. 1 (Prior Art) shows main memory 10 is in communication with cache set 12 and CPU (processor) 14. Line 1400 (where information is stored) is requested by the CPU, retrieved from main memory 10 and stored in offset 400 of the cache. Sometime thereafter, the CPU retrieves line 2400 from main memory and maps it into offset 400 of the cache. Thus line 2400 has overwritten the previously stored line 1400. When the CPU looks for line 1400, it will not find it. The CPU must again retrieve line 1400 from the main memory. A miss penalty is therefore incurred because the cache did not contain the previously stored line.

In the situation described above, with each miss penalty, the execution of the program is slowed. Miss penalties are particularly troublesome when both lines 1400 and 2400 are frequently needed. This ping-pong scenario with its repeated victimization, results in a highly undesirable condition known as thrashing.

Returning to FIG. 1 to illustrate thrashing, the two lines, 1400 and 2400 are both needed on a regular basis by the CPU. Where prefetch instructions are part of executing code, valuable processing bandwidth is inefficiently used executing prefetch instructions which could have ignored had there not been a cache miss. When compounded miss penalties dominate the CPU's performance, a fast microprocessor's abilities are neither optimized nor realized.

There are many different types of cache structures which have been introduced in an effort to eliminate the thrashing problem. For example, one popular solution is to use, instead of a single-set cache as illustrated in FIG. 1, a "multi-set cache." Turning to FIG. 2, a two-set cache is shown. Both set 12 and 14 have a 400 offset location in which to store information. Thus, both lines 1400 and 2400 can be stored in the cache simultaneously and alternating requests for either of these will not cause thrashing. The actual benefit of a multi-set cache is dependent upon the program running. However, even with the multi-set improvement over the single-set cache, the performance cost for miss penalties continues to increase as CPU processing speeds increase.

In Harvard architecture where there are separate caches for data and instructions, thrashing is reduced, at least to the extent that data thrashes with instructions.

Various mechanisms exist which attempt to predict the CPU's needs ahead of time. For example, built into the SPARC (R) version 9 architecture is the capability to execute data prefetch instructions which will prefetch to the data cache of a Harvard architecture. However, the prefetch instruction is invariable, of a static size and provides no other accommodating characteristics.

Previously filed U.S. patent application Ser. Nos. 08/499,312 and 08/499,364, respectively entitled "Tunable Software Control of Harvard Architecture Cache Memories Using Prefetch Instructions" and "Memory Management Unit Incorporating Prefetch Control," each filed Jul. 7, 1995 and each naming David R. Emberson as inventor, disclose architecture and software prefetch controls for minimizing thrashing, each of which is hereby incorporated by reference.

Because prefetch instructions of a typical instruction stream provide only prefetches of an invariable, static size, a hardware mechanism for manipulating the characteristics of prefetch instructions to avoid thrashing is desirable.

SUMMARY OF THE INVENTION

This invention includes a hardware configuration for minimizing thrashing. In addition to a computer having a main memory, a processor and a cache, in accordance with this invention, the computer also includes a prefetch instruction buffer with an associated prefetch execution unit and a prefetch victim buffer.

A prefetch instruction is typically embedded in an instruction stream of an application which is running on the computer. Such a prefetch instruction usually includes an address field. During the execution of a prefetch instruction, the prefetch execution unit of this invention generates an additional field or fields with initial default settings, to create an augmented prefetch instruction. For example, the additional fields are for a cache set number, a size increment and/or an information type (data or instructions).

The prefetch execution unit operates to optimize prefetching by relying on an accounting of a particular cache miss' history. To record cache misses, victimized (overwritten) lines and/or a prefetch tag are stored in a prefetch victim buffer. When the processor experiences a cache miss, it accesses the prefetch victim buffer to retrieve information relating to the prefetch victim. The prefetch execution unit then modifies the values of the additional field or fields and then stores the modified augmented prefetch instruction in the prefetch instruction buffer. The next time a prefetch instruction for the victimized lines is executed by the processor, the new values of the modified augmented prefetch instruction will dictate where the prefetch information is stored or what size increment it has. By continuous modification of the augmented prefetch instructions, eventually thrashing may be eliminated.

DETAILED DESCRIPTION OF THE INVENTION

Figure 1:
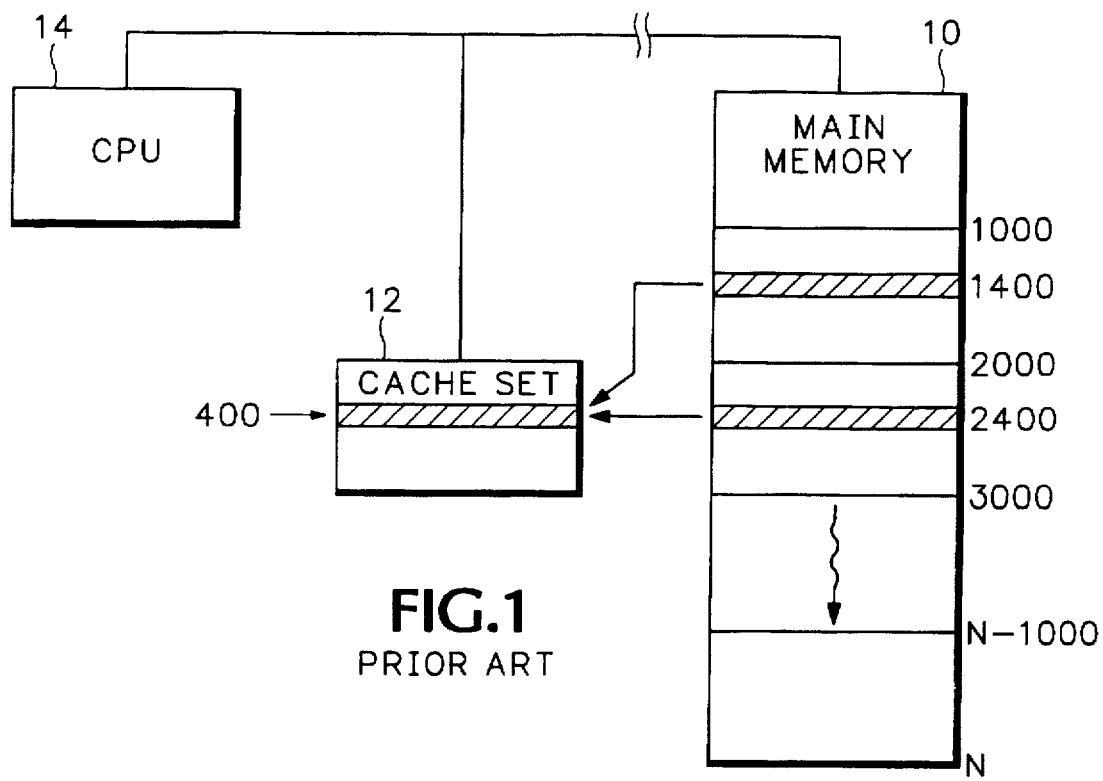
FIG. 1 depicts a prior art single-set cache.
Figure 2:
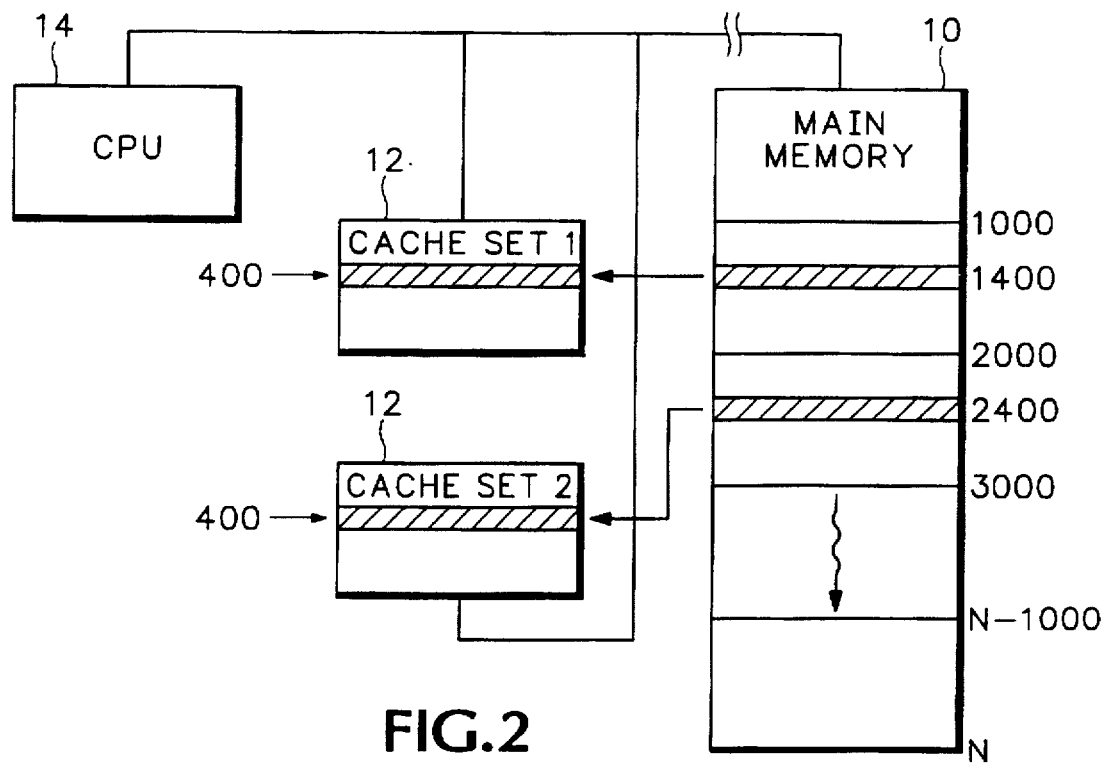
FIG. 2 depicts a prior art multi-set cache.
Figure 3:
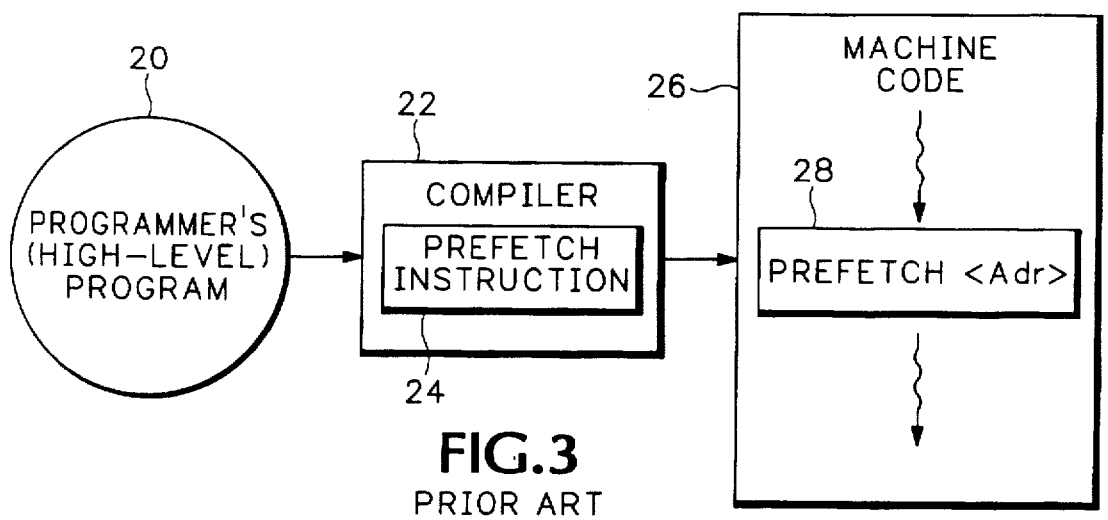
FIG. 3 shows the relationship between the high-level program, the compiler which insert the subject instruction and the machine code including the subject instruction.

A programmer typically programs software in a high level programming language. In FIG. 3, a high-level program 20 is operated on by a compiler 22 to insert a prefetch instruction 24 into the executable code. The machine code 26, including the prefetch instruction having an address field <Addr> 28, is processed by a processor. The location of information in main memory 10 contained in the address field is static.

This invention, an embodiment of which is described below as a combination of hardware components, augments the static prefetch instructions to have variable characteristics such as set numbers and size increments. Software or architecture components are also capable of carrying out this invention.

Figure 4:
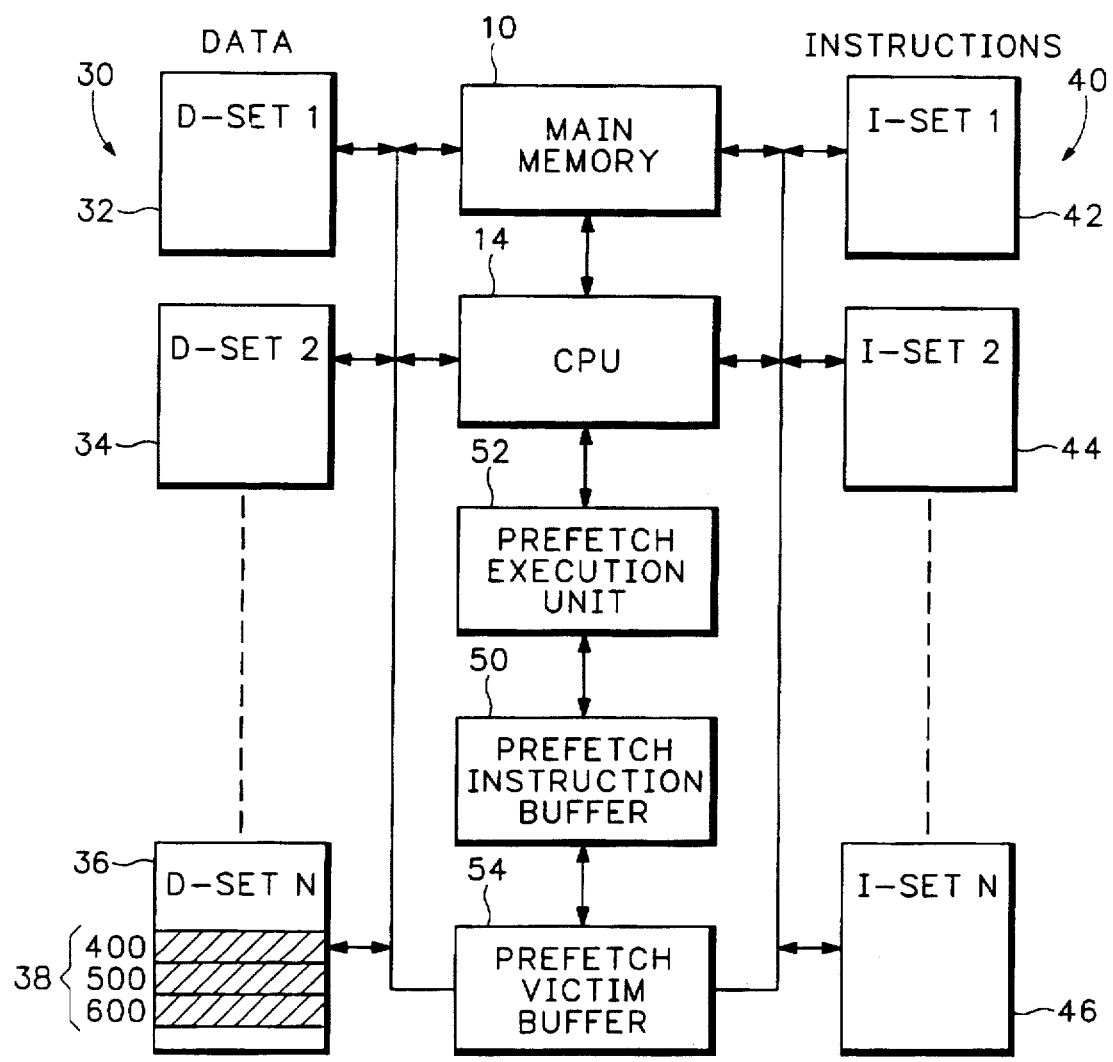
FIG. 4 depicts a Harvard architecture system where a prefetch instruction of this invention is carried out.

Turning to FIG. 4, the CPU 14 will receive an instruction stream containing a prefetch instruction including an address field. Upon receipt of the prefetch instruction, the CPU looks for that particular instruction in the prefetch instruction buffer 50. If it is not in buffer 50, the prefetch execution unit 52 will augment the prefetch instruction to include variable fields. The prefetch execution unit 52 is typically part of the CPU, being one of its execution units. In FIG. 4, the prefetch execution unit is separately shown for the purpose of illustration. For example, the binary fields are configured as follows:

PREFETCH<Addr Translation Info><I/D Bit><Set #><Size>.

Once augmented, the instruction is stored in the prefetch instruction buffer 50 with initial field value settings. The initial values for these fields are generated by the prefetch execution unit 52. The initial setting for the I/D bit depends upon whether the information is data or instructions. According to FIG. 4, the data cache 30 includes a plurality of sets, 32, 34 and 36. The instruction cache 40 includes a plurality of sets 42, 44 and 46.

The initial settings for the cache set number fields are, for example, sequential for sequential prefetch instructions to avoid overwriting previously stored lines. The size field setting will depend upon the type of program running, for example, whether its data files are large or small.

The initial field settings are adjusted to optimize the potential for avoiding thrashing based on the particular application running on the processor. However, when there is a cache miss, the augmented prefetch settings will need to be modified, which is discussed below.

When a prefetch instruction is executed which evicts lines stored in the cache, information relating to the victimized lines 38 (lines 400-600 of D-SET N 36) is stored in the prefetch victim buffer 54. During the execution of the program by processor 14, the next time there is a cache miss with respect to those victimized lines 38, the processor retrieves information relating to the victimized lines from the prefetch victim cache. For example, the actual victim lines are stored in the prefetch victim cache, along with a prefetch tag. Alternatively, only their prefetch tag is stored. The prefetch tag maps to the augmented prefetch instructions stored in the prefetch instruction buffer 50. The augmented prefetch instruction is then modified by the prefetch execution unit by changing the field values.

In the prefetch instruction buffer 50, a record is kept of the modifications made to the augmented prefetch instruction. For example, a set number record is kept so that a set counter can add an increment to the value contained in the set number field in the next modification.

Figure 5:
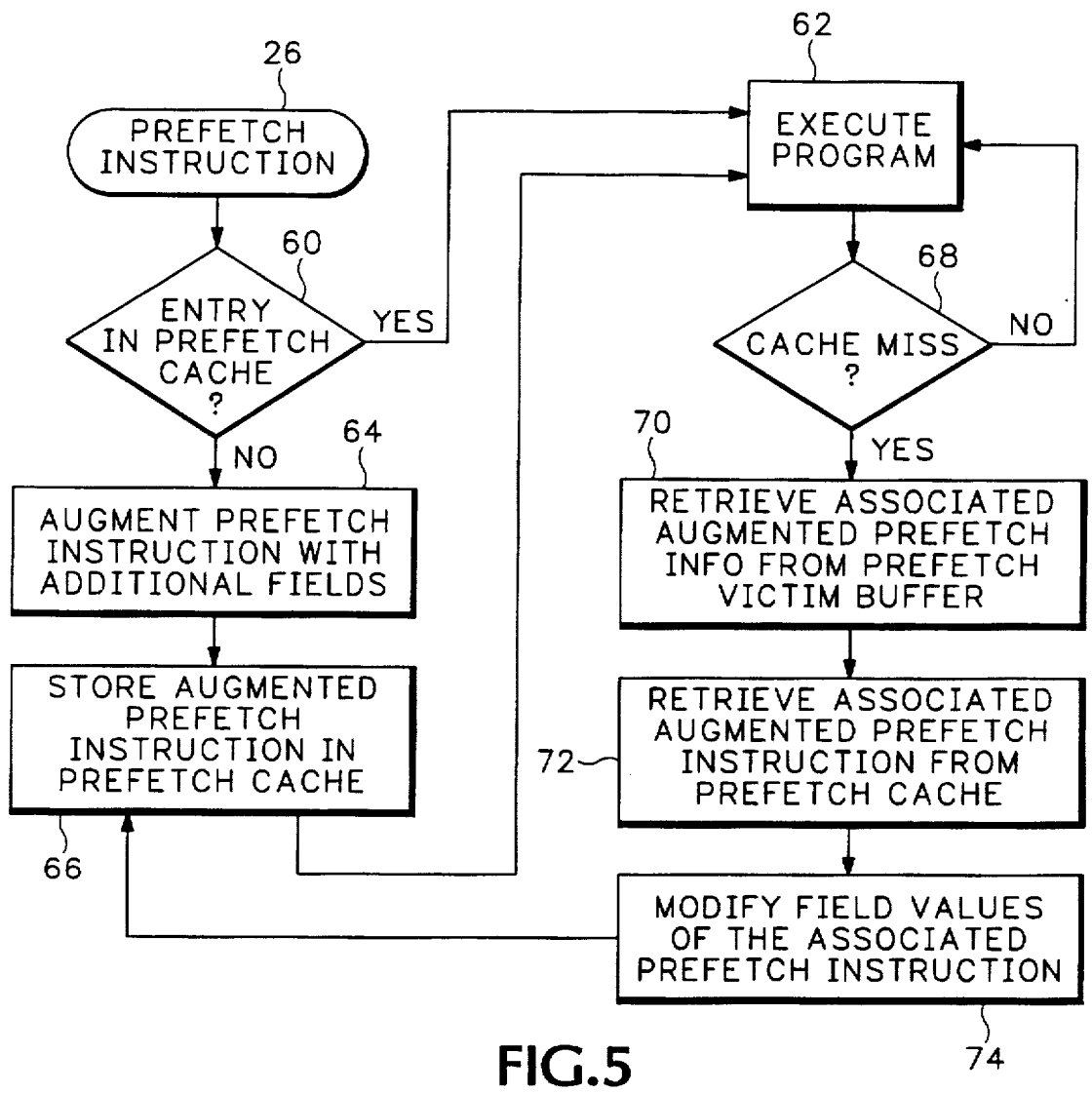
FIG. 5 is a flowchart showing steps to carry out this invention.

Turning to FIG. 5, a high level flowchart of this invention is shown. An instruction stream including a prefetch instruction 26 (see FIG. 3) is processed by the processor 14. When a prefetch instruction 28 is part of the instruction stream 26, the prefetch execution unit 52 determines whether there already exists an entry in the prefetch instruction buffer 50 for that particular prefetch instruction at decision box 60. If the answer is yes, then the program in operation is executed at box 62. If there is no entry in the prefetch instruction buffer 50 for that particular prefetch instruction, then the prefetch execution unit 52 augments the prefetch instruction with additional fields at box 64. As discussed above, fields are added so that the prefetch instruction will include a data/instruction field, a set number field and a size field.

The new fields are assigned initial values. The initial set number assigned depends upon the set number assigned to the previously processed prefetch instruction. For example, if the first processed prefetch instruction's set field is assigned a set number D-Set 1 value, then the second processed prefetch instruction's set field is assigned a set number D-Set 2 value. The size increment value is initially equivalent to that provided by the address field.

Once the new fields have been assigned their initial values, the augmented prefetch instruction is stored in a prefetch instruction buffer 50 at box 66. The program is executed at box 62 during or after the prefetch instruction augmentation steps.

If during the execution of the program at box 62, there is no cache miss at box 68, the program continues its execution at box 62. However, if there is a cache miss, the fields of the relevant augmented prefetch instruction need to be adjusted to avoid thrashing. In such an event, at box 70 the processor retrieves from the prefetch victim buffer 54 either the victimized data or instructions itself and/or a prefetch tag identifying the prefetch instruction responsible for storing the data or instructions in cache 30 or 40 at the outset. At box 72, the actual augmented prefetch instruction is retrieved so that the fields may be altered in a manner discussed below.

The process of field modification occurs at box 74. Once modified, that augmented prefetch instruction is stored in the prefetch instruction buffer 50 at box 66. Therefore, the next time the instruction stream includes that prefetch instruction, its modified counterpart is accessed from the prefetch instruction buffer for execution. By optimizing the modifications, repeated modifications of the augmented prefetch instructions will ultimately avoid undesirable thrashing situations.

Figure 6:
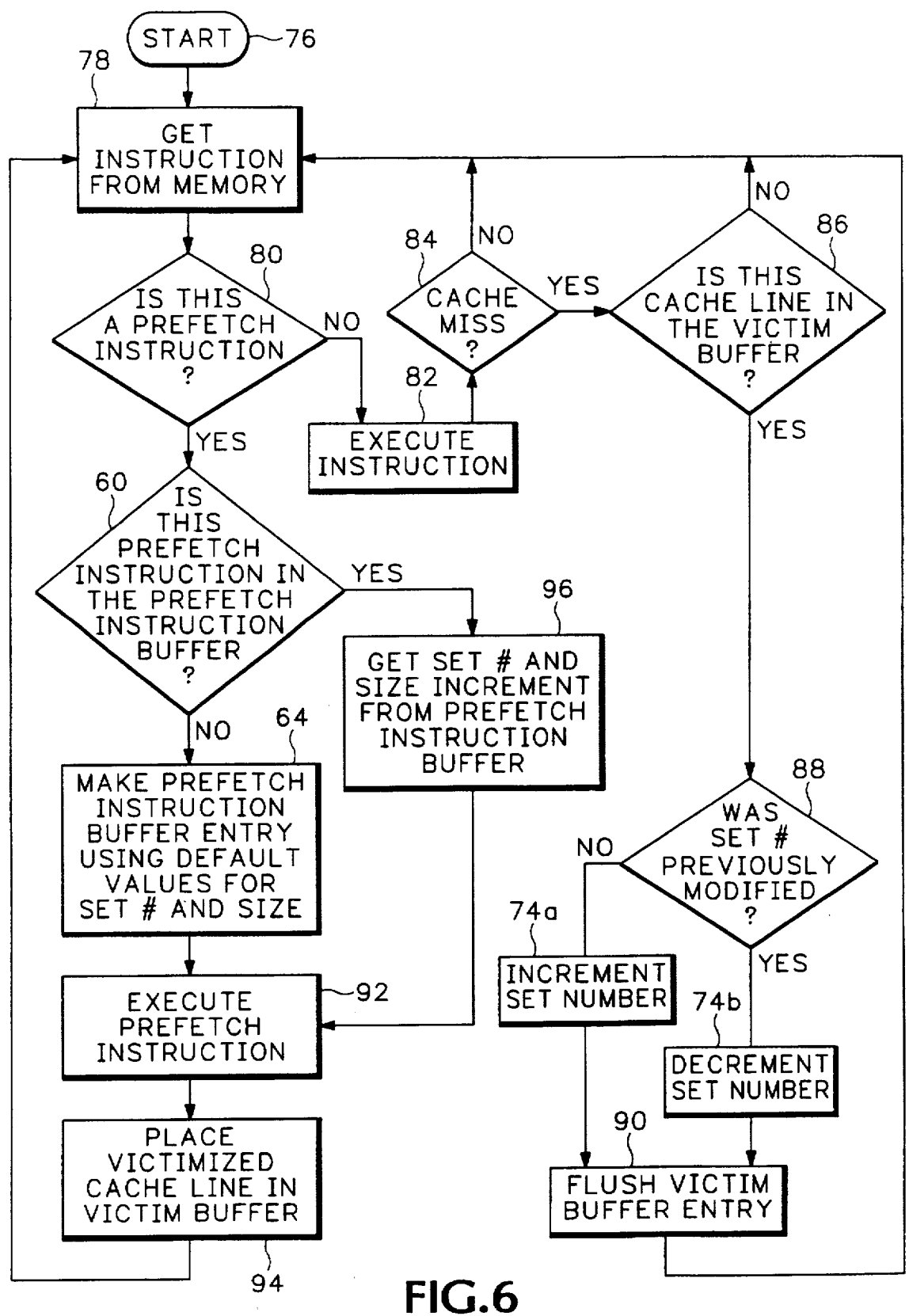
FIG. 6 is a flowchart showing additional steps to carry out this invention.

FIG. 6 is flowchart which shows steps in addition to those shown in FIG. 5. As discussed above, as a program starts to run at box 76, instructions are requested by the processor 14 from main memory 10 at box 78. At box 80, if an instruction is not a prefetch instruction, the instruction is simply executed at box 82. If no cache miss occurs at box 84 then the program proceeds so that instructions are again requested by the processor 14 from main memory 10 at box 78. However, if the there is a cache miss at box 84, the question is whether the missed cache lines are in the victim buffer 54. At box 86, if the missed cache lines are not in the victim buffer 54, then the process needs to start again at box 78, that is, data or instructions will need to be retrieved from the main memory.

If the missed cache lines are in the victim buffer 54, the next step is to ask whether the set number of the prefetch instruction responsible for the storage of the missed cache lines was previously modified. At box 88, the answer will determine whether the set number is incremented or the size of the data or instruction retrieved from memory should be reduced (or increased depending upon the circumstances). There is a bit in the prefetch instruction buffer that indicates whether the set number was modified. For each prefetch instruction, it is originally set to zero. If a prefetch instruction has been modified, then the bit will be set to one. Therefore, there is a record in the prefetch instruction buffer that a particular prefetch instruction has been modified. Alternatively, the modification record is a number of bits which counts up to the number of cache sets and then provides an indication of the how many set modifications have occurred.

In the event that a particular prefetch instruction has been modified so that each available set number has been used (at box 74a) and cache misses are still occurring, then the size field value is modified (at box 74b). That is, in the case where each set number has been used, only to create another victim, the size field is modified. By modifying the values of the augmented prefetch instruction's fields, the next time the prefetch instruction is executed it will not overwrite the cache line which was victimized. In this manner, thrashing is avoided. Finally, at box 90, the victim lines are flushed from the victim buffer in that they are no longer victims.

Briefly turning to the left side of the flowchart of FIG. 6, in the event that an instruction is a prefetch instruction at box 80, the processor looks for the prefetch instruction in the prefetch instruction buffer 50 at box 60. In the event that the prefetch instruction is not in the prefetch instruction buffer at box 60, then an entry is made in the prefetch instruction buffer at box 64. The prefetch instruction is then executed at box 92. The cache line victimized by the prefetch instruction is placed in the prefetch victim buffer 54 at box 94. Alternatively, in the case where a prefetch instruction was retrieved from main memory and an entry that corresponds to that prefetch instruction is in the prefetch instruction buffer 54 at box 60, then the set number and size values are retrieved from the prefetch instruction buffer 54 and inserted in the set number and size fields of the augmented prefetch instruction (instead of inserting default values) at box 96. This modified prefetch instruction is then executed at box 92. If that prefetch instruction victimizes lines from the cache, then those victimized lines are stored in the prefetch victim buffer 54 at box 94.

I claim:

1. A computer apparatus having a main memory, a processor in communication with said main memory and configured to receive and execute an instruction stream including prefetch instructions, and a cache in communication with said processor, said cache including a plurality of cache sets identifiable by cache set numbers configured to store information of varying increments, comprising:

a prefetch execution unit in communication with said processor, said prefetch execution unit for providing said prefetch instructions with fields and further providing said fields with initial default values to generate augmented prefetch instructions; and a prefetch instruction buffer in communication with said prefetch execution unit, said prefetch instruction buffer for storing said augmented prefetch instructions for retrieval at the execution of said prefetch instruction.

2. A computer apparatus as recited in claim 1 wherein one of said fields is for containing values associated with cache set numbers.

3. A computer apparatus as recited in claim 1 wherein one of said fields is for containing values associated with prefetch size increments.

4. A computer apparatus as recited in claim 1 wherein said cache includes different cache sets for information which is data and for information which are instructions and wherein one of said fields is for containing values associated whether said information is data or instructions.

5. A computer apparatus as recited in claim 1 wherein said processor executed a first augmented prefetch instruction causing first information to be retrieved from main memory and stored in one of said cache sets and said processor executed a second augmented prefetch instruction causing second information to be retrieved from main memory and stored in said one of said cache sets so that said first information is overwritten by said second information, to generate a first prefetch victim, said computer apparatus further comprising:

a prefetch victim buffer in communication with said prefetch execution unit for storing information related to said first prefetch victim.

6. A computer apparatus as recited in claim 5 wherein said first prefetch victim is identifiable by a prefetch tag.

7. A computer apparatus as recited in claim 6 wherein said prefetch victim buffer stores said prefetch tag.

8. A computer apparatus as recited in claim 5 wherein said prefetch victim buffer stores said prefetch victim.

9. A computer apparatus as recited in claim 5 wherein said processor is configured to access said prefetch victim buffer to retrieve said information related to said first prefetch victim subsequent to said processor accessing said cache to retrieve said first information, such having been overwritten by said second information.

10. A computer apparatus as recited in claim 5 wherein said prefetch execution unit receives said information related to said first prefetch victim and modifies the values associated with said fields of said first augmented prefetch instruction and stores them in said prefetch instruction buffer.

11. A computer apparatus having a main memory, a processor in communication with said main memory and configured to receive and execute an instruction stream including prefetch instructions, and a cache in communication with said processor, said cache including a plurality of cache sets identifiable by cache set numbers configured to store information of varying increments, comprising:

means in communication with said processor for providing said prefetch instructions with fields;

means in communication with said processor for providing said fields with initial default values to generate augmented prefetch instructions; and means in communication with said processor for storing said augmented prefetch instructions for retrieval at the execution of said prefetch instruction.

12. A computer apparatus as recited in claim 11 wherein one of said fields is for containing values associated with cache set numbers.

13. A computer apparatus as recited in claim 11 wherein one of said fields is for containing values associated with prefetch size increments.

14. A computer apparatus as recited in claim 11 wherein said cache includes different cache sets for information which is data and for information which are instructions and wherein one of said fields is for containing values associated whether said information is data or instructions.

15. A computer apparatus as recited in claim 11 wherein said processor executed a first augmented prefetch instruction causing first information to be retrieved from main memory and stored in one of said cache sets and said processor executed a second augmented prefetch instruction causing second information to be retrieved from main memory and stored in said one of said cache sets so that said first information is overwritten by said second information, to generate a first prefetch victim, said computer apparatus further comprising:

means in communication with said processor for storing information related to said first prefetch victim.

16. A method operable on a computer having a main memory, a processor in communication with said main memory and configured to receive and execute an instruction stream including prefetch instructions, and a cache in communication with said processor, said cache including a plurality of cache sets identifiable by cache set numbers configured to store information of varying increments, said method comprising the steps of:

providing prefetch instructions with fields;

providing said fields with initial default values to generate augmented prefetch instructions; and storing said augmented prefetch instructions for retrieval at the execution of said prefetch instruction.

17. A method as recited in claim 16 wherein one of said fields is for containing values associated with cache set numbers.

18. A method as recited in claim 16 wherein one of said fields is for containing values associated with prefetch size increments.

19. A method as recited in claim 16 wherein said cache includes different cache sets for information which is data and for information which are instructions and wherein one of said fields is for containing values associated whether said information is data or instructions.

20. A method as recited in claim 16 wherein said processor executed a first augmented prefetch instruction causing first information to be retrieved from main memory and stored in one of said cache sets and said processor executed a second augmented prefetch instruction causing second information to be retrieved from main memory and stored in said one of said cache sets so that said first information is overwritten by said second information, to generate a first prefetch victim, further comprising the step of:

storing information related to said first prefetch victim.

21. A prefetch instruction optimizing device operable in conjunction with a computer apparatus having a main memory, a processor in communication with said main memory and configured to receive and execute an instruction stream including prefetch instructions, and a cache in communication with said processor, said cache including a plurality of cache sets identifiable by cache set numbers configured to store information of varying increments, said prefetch instruction optimizing device comprising:

a prefetch execution unit configured to communicate with said processor, said prefetch execution unit for providing said prefetch instructions with fields and further providing said fields with initial default values to generate augmented prefetch instructions; and a prefetch instruction buffer configured to communicate with said prefetch execution unit, said prefetch instruction buffer for storing said augmented prefetch instructions for retrieval at the execution of said prefetch instruction.

22. A prefetch instruction optimizing device as recited in claim 21 wherein one of said fields is for containing values associated with cache set numbers.

23. A prefetch instruction optimizing device as recited in claim 21 wherein one of said fields is for containing values associated with prefetch size increments.

24. A prefetch instruction optimizing device as recited in claim 21 wherein said cache includes different cache sets for information which is data and for information which are instructions and wherein one of said fields is for containing values associated whether said information is data or instructions.

25. A prefetch instruction optimizing device as recited in claim 21 wherein said processor is configured to execute a first augmented prefetch instruction causing first information to be retrieved from main memory and stored in one of said cache sets and said processor is further configured to execute a second augmented prefetch instruction causing second information to be retrieved from main memory and stored in said one of said cache sets so that said first information is overwritten by said second information, to generate a first prefetch victim, said prefetch instruction optimizing device further comprising:

a prefetch victim buffer in communication with said prefetch execution unit for storing information related to said first prefetch victim.

26. A prefetch instruction optimizing device as recited in claim 25 wherein said first prefetch victim is identifiable by a prefetch tag.

27. A prefetch instruction optimizing device as recited in claim 26 wherein said prefetch victim buffer stores said prefetch tag.

28. A prefetch instruction optimizing device as recited in claim 25 wherein said prefetch victim buffer stores said prefetch victim.

29. A prefetch instruction optimizing device as recited in claim 25 wherein said prefetch victim buffer is configured to be accessed by said processor so that said processor may retrieve said information related to said first prefetch victim subsequent to said processor accessing said cache to retrieve said first information, such having been overwritten by said second information.

30. A prefetch instruction optimizing device as recited in claim 25 wherein said prefetch execution unit receives said information related to said first prefetch victim and modifies the values associated with said fields of said first augmented prefetch instruction and stores them in said prefetch instruction buffer.

* * * * *

UNITED STATES PATENT AND TRADEMARK OFFICE
CERTIFICATE OF CORRECTION

PATENT NO.   : 5,761,468
DATED        : June 2, 1998
INVENTOR(S)  : David R. Emberson It is certified that error appears in the above-identified patent and that said Letters Patent is hereby corrected as shown below:

Title page,
Insert item [73], Assignee, -- Sun Microsystems, Inc., Mountain View, CA. --

Signed and Sealed this

Twenty-third Day of April, 2002

Attest:

Attesting Officer

JAMES E. ROGAN
Director of the United States Patent and Trademark Office